(12) United States Patent
Hardt et al.

(10) Patent No.: US 11,381,620 B2
(45) Date of Patent: Jul. 5, 2022

(54) METHOD AND APPARATUS FOR WI-FI VIDEO PACKET RE-PRIORITIZATION FOR LIVE MPEG TRANSPORT STREAMING

(71) Applicant: ARRIS Enterprises LLC, Suwanee, GA (US)

(72) Inventors: Charles Hardt, Lawrenceville, GA (US); Albert F. Elcock, West Chester, PA (US); Christopher S. DelSordo, Souderton, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/157,013

(22) Filed: Jan. 25, 2021

(65) Prior Publication Data

US 2021/0243241 A1 Aug. 5, 2021

Related U.S. Application Data

(60) Provisional application No. 62/967,911, filed on Jan. 30, 2020.

(51) Int. Cl.
*G06F 15/16* (2006.01)
*H04L 65/60* (2022.01)
*H04L 47/24* (2022.01)

(52) U.S. Cl.
CPC .............. *H04L 65/60* (2013.01); *H04L 47/24* (2013.01)

(58) Field of Classification Search
CPC .................................. H04L 65/60; H04L 47/24
See application file for complete search history.

(56) References Cited

U.S. PATENT DOCUMENTS

| 7,561,522 B1 * | 7/2009 | Cotter | H04J 14/0212 |
| | | | 370/235 |
| 8,971,184 B2 * | 3/2015 | Howe | H04L 43/16 |
| | | | 370/230.1 |

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated May 3, 2021, by the International Application Division Korean Intellectual Property Office in corresponding International Application No. PCT/US2021/014295. (10 pages).

*Primary Examiner* — Oleg Survillo
(74) *Attorney, Agent, or Firm* — Panitch Schwarze Belisario & Nadel LLP (57) ABSTRACT

Transmitting from a wireless router a live stream of time stamped multimedia packets from a server which is capable of providing a system time clock value is disclosed. The wireless router includes a queue for storing the time stamped multimedia packets received from the live streaming server. The wireless router also includes a processor for analyzing the priority of the time stamped multimedia packets stored in the queue, for comparing the time stamps to the system time clock value, for calculating a transmission time to a video client, and for determining a transmission window to transmit the time stamped multimedia packets. The time stamped multimedia packets are discarded if the packets cannot be transmitted within the transmission window, or the time stamped packets are immediately transmitted if they can be transmitted within the transmission window. The priority of the packets in queue may be re-sorted prior to transmission.

12 Claims, 4 Drawing Sheets

(56) References Cited

U.S. PATENT DOCUMENTS

| | | | | |
|---|---|---|---|---|
| 9,794,143 | B1* | 10/2017 | Chari | H04L 43/08 |
| 2005/0099979 | A1 | 5/2005 | Chandra | |
| 2005/0141503 | A1* | 6/2005 | Welfeld | H04L 45/60 |
| | | | | 370/392 |
| 2006/0050690 | A1* | 3/2006 | Epps | H04L 47/21 |
| | | | | 370/359 |
| 2008/0198866 | A1* | 8/2008 | Shahar | H04L 47/245 |
| | | | | 370/412 |
| 2009/0086747 | A1* | 4/2009 | Naven | H04L 49/901 |
| | | | | 370/412 |
| 2012/0039173 | A1* | 2/2012 | Danzig | H04L 47/52 |
| | | | | 370/235.1 |
| 2012/0106551 | A1 | 5/2012 | Yousefi et al. | |
| 2013/0077641 | A1* | 3/2013 | Burger, Jr. | H04L 9/3297 |
| | | | | 370/474 |
| 2014/0164640 | A1* | 6/2014 | Ye | H04L 47/30 |
| | | | | 709/235 |
| 2015/0173095 | A1* | 6/2015 | Ansley | H04W 72/0446 |
| | | | | 370/336 |
| 2017/0013533 | A1 | 1/2017 | Felemban et al. | |
| 2018/0091570 | A1* | 3/2018 | Hardt | H04L 43/16 |
| 2019/0166061 | A1* | 5/2019 | Farkas | H04L 47/621 |

* cited by examiner

METHOD AND APPARATUS FOR WI-FI VIDEO PACKET RE-PRIORITIZATION FOR LIVE MPEG TRANSPORT STREAMING

FIELD OF THE INVENTION

The present invention relates generally to a method and apparatus for communicating video and broadband signals over a communication network, and more particularly to Wi-Fi video packet re-prioritization for live MPEG transport streaming.

BACKGROUND OF THE INVENTION

Cable service providers, which are also referred to as Multiple System Operators ("MSO"), typically transmit analog and digital video broadcast television signals, as well as broadband data services, to their customers. These broadband data services typically include Internet access using the Data Over Cable Service Interface Specification ("DOCSIS") protocol. To provide television and data Services, a MSO typically uses a Cable Modem Termination System ("CMTS") for the data services and a quadrature amplitude modulation ("QAM") multiplexer for downstream broadcast television, narrow cast and video on demand ("VoD") traffic signals. For telephone companies (Telcos) that do not use DOCSIS and CMTS, the use of a PCR clock reference from the Video Server to set the timebase of the video client device or set top or the pts clock is still relevant, as is.

These devices may be located at one or more hubs, which are typically connected to the head end via a network according to a networking protocol, such as, for example, Ethernet or SONET, as known in the art. These devices typically have multiple outputs for downstream signals, as well as multiple inputs for upstream signals, that are sent to or received at consumer households, bars, and commercial establishments.

It is not uncommon in households of today's consumers to have simultaneous Wi-Fi video streaming sessions occurring within the same household. The same holds true for bars and commercial establishments. Video streaming sessions require Wi-Fi routers to employ a Quality of Service ("QoS") technique called WMM ("Wi-Fi Multimedia") which prioritizes video and/or voice over that of general data packet transmission. This solution works well for most situations, but it does not address prioritizing delivery of video packets from one Wi-Fi video streaming session over another Wi-Fi video streaming session.

MSOs are now providing over the top delivery of video services using live MPEG transport via multicast group or single-cast IP addressing. Services such as ESPN would belong to a multicast group and Wi-Fi clients could receive these services by joining a group or the service is simply single-cast addressed. These types of service delivery mechanism encapsulate MPEG transport streams inside the IP message wrapper. Since this service delivery is based on live MPEG streaming, the headend server controls the video clients decoding and presentation directly via a common System Time Clock ("STC"). This means that timely delivery of these video packets is essential from the headend server all the way downstream to a video client connected to a Wi-Fi router. This also means that situations can arise in which there could be a need to prioritize one video client streaming session over another video client streaming session on a Wi-Fi router.

In order to prioritize the multimedia signals transmitted from a Wi-Fi router, the multimedia signals are given priority in accordance with the WMM standard. WMM (Wi-Fi Multimedia from IEEE 802.11e standard) is an automated service that gives priority to multimedia running through a wireless network. That includes support for maintaining the priority of some applications over other applications which are less time critical. By using QoS, WMM ensures that the applications that require better throughput and performance are inserted in queues with higher priority. WMM prioritizes traffic according to four Access Categories ("AC"), which are known as 1) best effort, 2) background, 3) video, and 4) voice, and the Access Categories are identified by the acronyms (AC_BE, AC_BK, AC_VI and AC_VO). WMM, however, does not provide guaranteed throughput. It is, however, suitable for applications that require QoS, such as Voice over IP ("VoIP") on Wi-Fi phones.

The priorities of each of the WMM categories set forth in the IEEE 802.11e Standard are:
  AC_BE (Best Effort): Medium priority queue, medium throughput and delay. Most traditional IP data is sent to this queue.
  AC_BK (Background): Lowest priority queue, high throughput. Bulk data that requires maximum throughput and is not time-sensitive is sent to this queue (FTP data, for example):
  AC_VI (Video): High priority queue, minimum delay. Time-sensitive data such as Video and other streaming media are automatically send to this queue.
  AC_VO (Voice): Highest priority queue, minimum delay. It should be noted that time-sensitive data such as Voice over IP (VoIP) is automatically sent to this queue.

In addition to the WMM priorities set forth in the IEEE 802.11e standard, there is also a Modulation and Coding Scheme ("MCS") which provides index values that can be used to determine the likely data rate of a Wi-Fi connection. The MCS index value list gives every combination of "number of spatial streams+modulation type+coding rate" that is possible. Each Wi-Fi streaming session is assigned a particular MCS index value. The MCS index value indicates the 'over the air' data rate of a link. Using the data rate the actual usable data throughput can be derived. The data rate can then be used to determine the time it will take to transmit the video packet form the Wi-Fi router to the video client.

There is also a mechanism known as Clear Channel Assessment ("CCA") which is one of two carrier sense mechanisms in Wireless Local Area Network ("WLAN") or Wi-Fi. It is defined in the IEEE 802.11-2007 standards as part of the Physical Medium Dependent ("PMD") and Physical Layer Convergence Protocol ("PLCP") layer. CCA is a mechanism in which multiple technologies using unlicensed spectrum can coexist. CCA is a mechanism for determining whether the medium is idle or not. CCA basically informs the Wi-Fi client that the channel is clear to send data. The 802.11 client uses a back-off algorithm whenever the Clear Channel Access protocol determines that the channel is not clear and data should not be sent.

Video streaming sessions that use live MPEG transport transmission techniques are used in today's cable and telco environments that use single-cast of multicast IP transmission of MPEG single program transport streams.

The headend video encoder sends PCR (i.e., Program Clock Reference) stream which is used to adjust an oscillator resident on the video client device which supplies an onboard System Time Clock ("STC") value. The video client uses the STC to determine when to decode and render the video packet. The presentation and decode timestamps reside inside the video packets, and they are used determine when to decode and when to present the video packet. If the video packet is received too late to either decode and/or present the packet, then this will result in video artifacts. Wi-Fi can impose delays on the transmission of these video packets. Moreover, Wi-Fi transmission is especially troublesome with regards to transmitting these video packets in a timely manner when simultaneous video streaming sessions occur.

Any delays caused by transmitting live MPEG transport session video packets over Wi-Fi can cause problems. This is especially true if multiple live MPEG streaming sessions are using the same Wi-Fi router. Accordingly, there is a need for enhancements to a WMM network by providing a re-prioritization technique of video packets based on the need to decode and present video.

SUMMARY OF THE INVENTION

The present invention relates to a method and apparatus for re-prioritizing or discarding live MPEG transport video packets sent via a Wi-Fi router in a Wi-Fi Multimedia network which includes a high priority queue, having minimum delay. In the IEEE 802.11e Standard, this high priority queue is referred to as WMM AC_VI (Video). Time-sensitive data such as video and other streaming media are automatically sent to this queue. The present invention continuously monitors the prioritization of packets in the WMM AC_VI queue to account for changes in the Wi-Fi network environment, and provides for discarding packets that will never make it to the Wi-Fi client. Discarding packets increases the chances that other video packets will reach their destinations in time. Periodically, the Wi-Fi Router communicates with the live MPEG Wi-Fi clients and obtains updated information in order to re-run prioritization algorithms and make any necessary changes. This monitoring process uses data and performs calculations as is done when a video packet is first inserted in the WMM AC_VI queue.

DETAILED DESCRIPTION OF THE PREFERRED EMBODIMENTS AND METHODS

Figure 1:
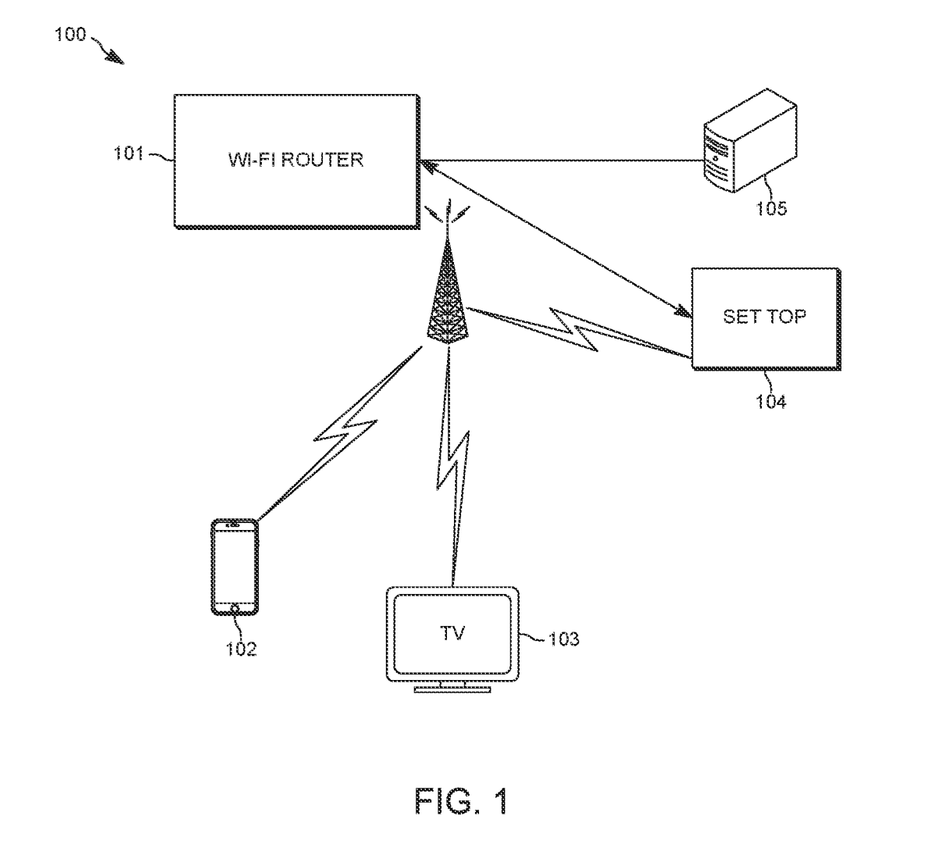
FIG. 1 is a system diagram of a Wi-Fi Multimedia network related to the present invention.

Referring now to FIG. 1, a system diagram illustrates a network 100 having a Wi-Fi router 101 for communicating with a plurality of video clients or devices within a Wi-Fi Multimedia Network. These video clients may include a cell phone 102, a digital TV ("DTV") 103, and a set top box 104. The Wi-Fi router is preferably connected to a remote live MPEG streaming encoder/server 105 that provides a PCR PID stream which synchs a STC between the server 105 and the video clients 102, 103, or 104. The server 105 also controls the STC of the video clients 102, 103, or 104, and each of the video clients 102, 103, or 104 is capable of initiating live MPEG streaming sessions.

The Wi-Fi router within the network 100 monitors the WMM AC_Vi queue and re-prioritizes/removes packets for live MPEG transport streaming sessions based on various Wi-Fi and live MPEG transport factors. The Wi-Fi router 101 obtains MCS index levels for live MPEG video client sessions, and it also detects increased CCA delays caused by Wi-Fi channel congestion. The Wi-Fi router 101 also maintains two way communications with the set top box 104 to obtain live MPEG information and Wi-Fi MCS index.

In order to enhance the Wi-Fi network 100 of FIG. 1, the present invention includes a monitoring process that communicates with the Wi-Fi clients 102, 103, or 104 on a continuous basis to determine the following information:

1. The Wi-FI Router 101 obtains an updated STC clock value from the client and resets its on-board timer.
2. Obtains a new MCS index level to learn of new Wi-Fi data rates that can occur over time.
3. Monitors the Clear Channel Assessment delays in order to calculate the true video packet transmit time to the clients 102, 103, or 104.

The present invention monitors changes due to Wi-Fi congestion. Wi-Fi congestion can occur for several reasons. It can be caused by neighboring Wi-Fi routers using the same channel as the consumers Wi-Fi router. Also, congestion can also occur when additional Wi-Fi clients need to be supported on the consumer's router. When Wi-Fi clients connected to different Wi-Fi routers share the same Wi-Fi channels, Clear Channel Assessment (CCA) back-off delays will occur. The more this type of congestion occurs the longer the delay imposed by CCA. This delay will affect the deliver time of live MPEG Video Packets. When additional Wi-Fi clients use the same Wi-Fi router, more Video packets are placed in the WMM AC_VI queue which also affect the deliver time of live MPEG Video Packets. The delay to get through the queue will increase.

The present invention makes use of the data rate associated with the MCS index value by factoring in the effect on transmission time of video frames to the Wi-Fi clients. It is important to take this into consideration when determining if packets in the WMM AC_VI queue should be re-prioritized.

The present invention can also make use of the knowledge of the delay imposed by this CCA by factoring this delay in to the time to transmit video frames to the Wi-Fi clients. It is helpful to take this delay into consideration when determining if the packets in the WMM AC_VI queue should be re-prioritized.

It should be noted that if the consumer's household has multiple multicast group video streaming sessions going on over Wi-Fi at the same time, WMM is not enough to make sure that video transmission for simultaneous users is sufficient. Just placing all the video packets in the same AC_VI queue in a first in first out ("FIFO") fashion is not enough to ensure the video is sent to the Wi-Fi client and displayed in time. The more video client streaming sessions, the more MMI does not provide enough support. The present invention provides a solution for enhancing the processing of the video packets in the AC_VI queue in such a way that the most critical packets are delivered first.

The present invention implements changes to the current FIFO WMM AC_VI queue processing, as illustrated in the flow diagrams of FIGS. 2-3 described below which include the details of the live MPEG transport flow. Systems that use multicast group addressing use live MPEG transport streaming techniques which require headend control of the video clients decode and presentation. Headend control is achieved via the use of the System Time Clock ("STC") as described above.

When a video packet arrives, a determination is made whether the video streaming session uses a live MPEG transport transmission schema. This step requires communication to the video client. If it does, then the STC clock value must be obtained from the video rendering client and it is then used to create an on-board timer, so it can continuously have access to the latest STC value for that client streaming session. There is also a need to keep track of the time to transmit for each video packet in the queue so that the incoming packet can be placed either at the end of the queue or in the appropriate position in the queue. If needed, packets can be inserted at the beginning of the queue for immediate transmission.

It is also important to determine the delta between the current STC and the video packets presentation timestamp ("PTS"), in order to determine the proper position in the queue. The PTS may be continuously monitored (monitored at a rate that does not cause a deterioration in operation of this disclosure), by the wireless router of Wi-Fi clients in communication with the wireless router.

The packet is placed in the proper position in the queue, or the packet is discarded, if it is determined that the packet cannot be transported in time (i.e., it is too late to transmit the packet, as the video frame is obsolete). The Wi-Fi router will determine the MCS index value of the video media streaming session. The MCS level provides the current over the air data rate for the media streaming session. The over the air data rate is one of the items that is used to determine the time it will take to transmit a packet the video media client.

The present invention includes support for continuously monitoring the prioritization of packets in the WMM AC_VI queue to account for changes in the Wi-Fi network environment. It should be noted that discarding packets that will never make it to the Wi-Fi client is an important feature of the present invention, since it increases the chances that other video packets will reach their destinations in time (i.e., since no air time is wasted sending obsolete data).

Periodically, the Wi-Fi router 101 of FIG. 1 communicates with the live MPEG Wi-Fi clients and obtains updated information in order to re-run prioritization algorithm and make any necessary changes. This monitoring process uses similar data and similar calculations as is done when a video packet is first inserted in WMM AC_VI queue. The flow diagrams described below provide more details.

It should be pointed out that other changes such as turning on a Microwave oven can cause interference to the Wi-Fi network. Interference influences the signal to noise ratio which can be detected by the Wi-Fi chips. The signal to noise ratio effects the Video clients current MCS index level. Furthermore, there is a direct correlation between the MCS index and the Wi-Fi data rate used to communicate to this client. The present invention makes make use of this data rate and it is used to calculate the time to transmit the video packet over the air to the client. Since interference can occur at any time, it is desirable to continue to monitor the MCS index level for MPEG live video sessions that occur over Wi-Fi. Also, the consumer walking around the house with a mobile Wi-Fi client could cause the MCS index to change (moving from one room in the house to the next). Mirrors can also cause havoc with Wi-Fi signals which cause MCS index changes.

Figure 2:
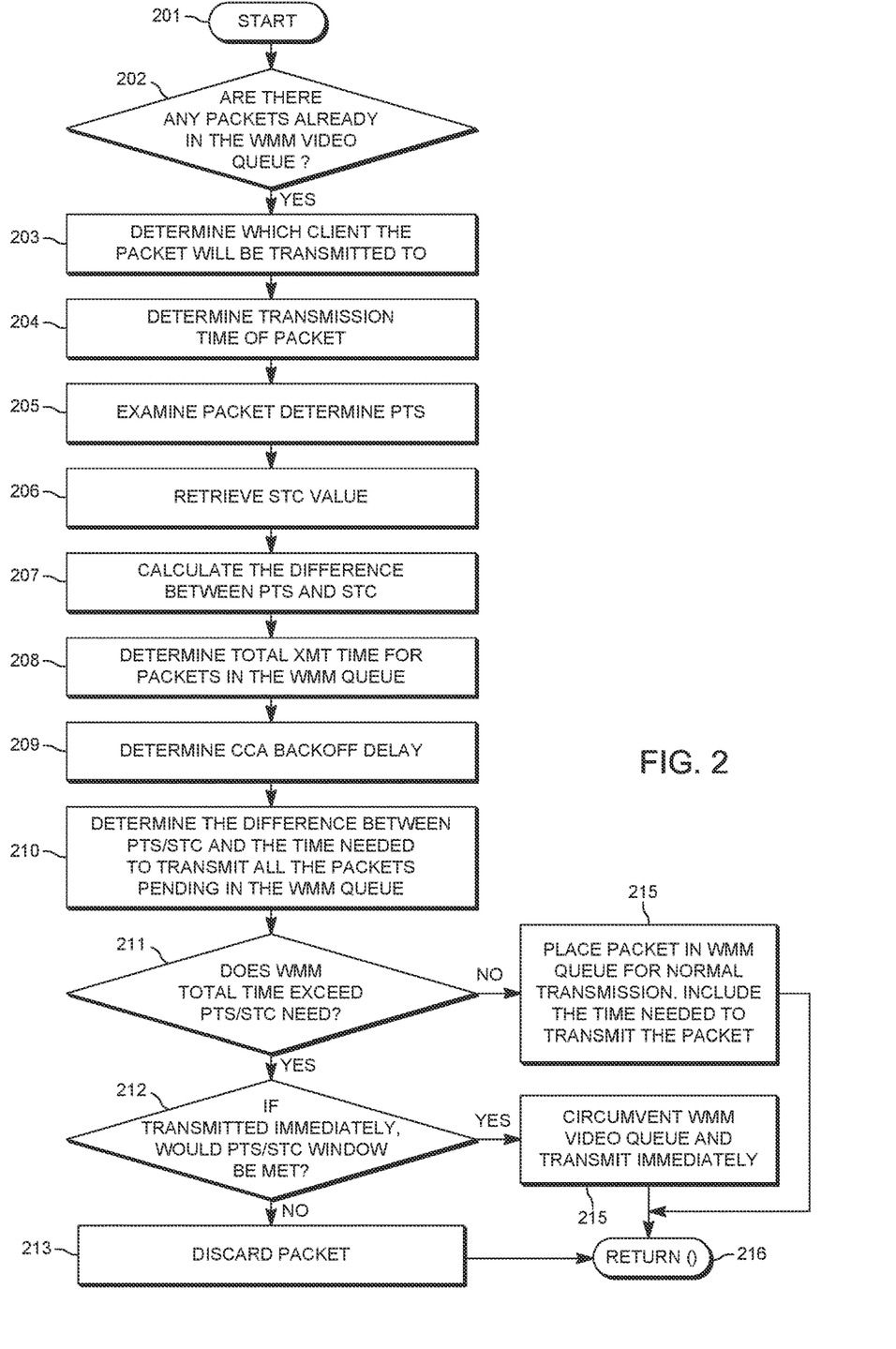
FIG. 2 is a flow diagram for determining whether packets in a WMM queue should be discarded, transmitted immediately, or transmitted normally.

FIG. 2 is a flow diagram for determining whether packets in a WMM queue should be discarded, transmitted immediately, or transmitted normally. The process begins with the starting step 201. In step 202, a determination is whether there are any packets already in the WMM video queue. If there are packets in the WMM video queue, then a determination is made where the packet will be transmitted to in step 203, and a determination of the transmission time is made in step 204. In step 205, the packet is examined to determine the PTS. In step 206, the STC value is retrieved, and then in 207, the difference between the PTS and STC is calculated. In step 208, a determination is made of the total transmit time for packets in the WMM queue. Additionally, in step 209, the CCA back off delay is determined. In step 210, a determination of the difference between PTS/STC and the time needed to transmit all the packets pending in the WMM queue. In step 211 a determination is made whether the WMM total time exceeds the PTS/STC. If the total time exceeds the PTS/STC, then in step 212 it is determined, if the packet is transmitted immediately, would the PTS/STC window be met. If PTS/STC cannot be met, then the packet is discarded in step 213. If in step 211 it was determined that the WMM total time does not exceed the PTS/STC, then in step 214 the packet is placed in the WMM queue for normal transmission including the time needed to transmit the packet. In step 212, a determination is made whether the PTS/STC window can be met, and if it can, then in step 215 the normal WMM video queue is circumvented and the packet is transmitted immediately. In step 216, the processing returns to the starting step 211.

Figure 3:
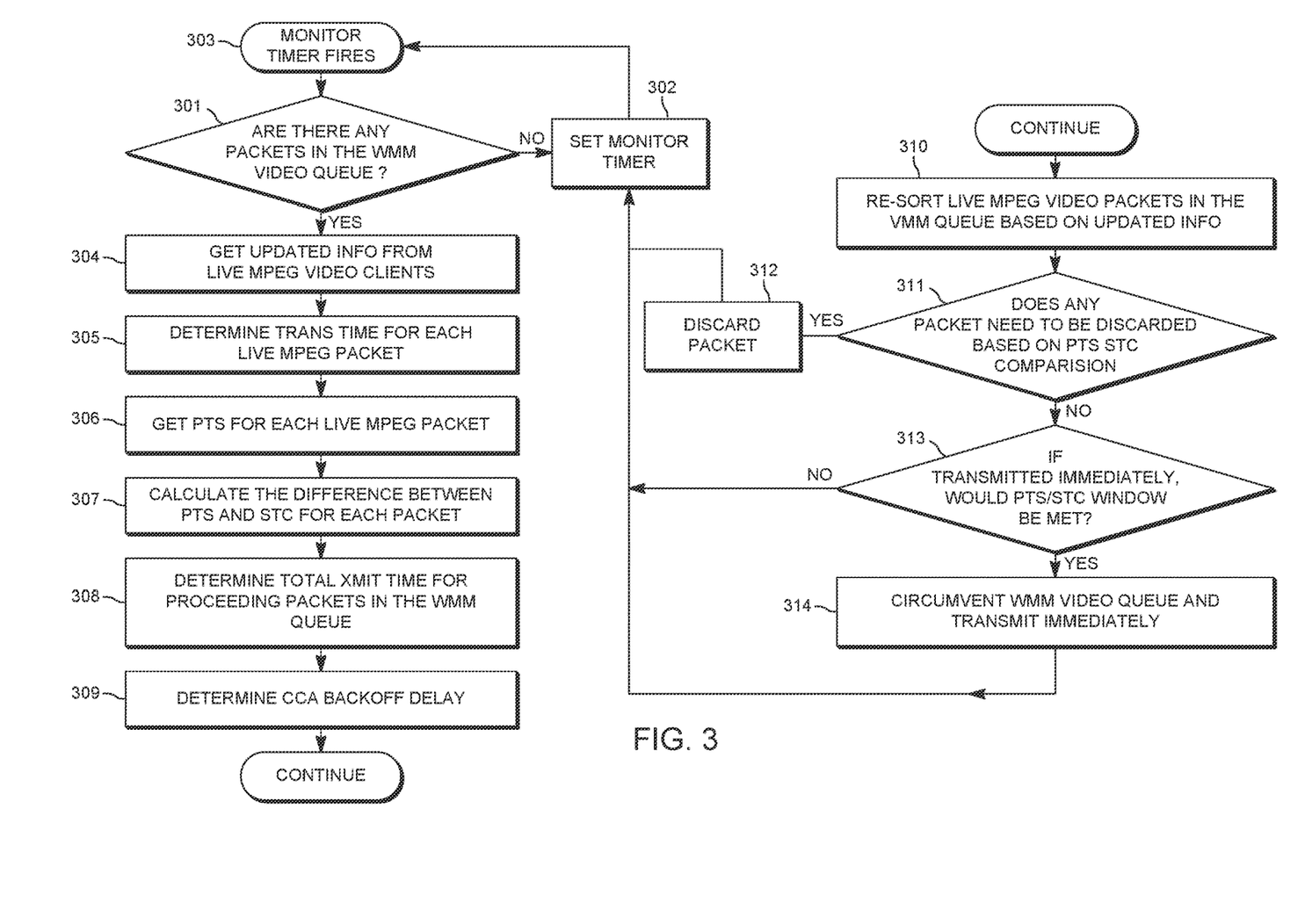
FIG. 3 is a flow diagram for determining whether packets in a WMM queue should be discarded, resorted or transmitted immediately.

FIG. 3 is a flow diagram for determining whether packets in a WMM queue should be discarded, resorted or transmitted immediately. The process begins by determining in step 301 whether there are any packets in the WMM video queue. If there are no packets in the WMM video a monitor timer is set in step 302, and after a predetermined time, the monitor timer is fired in step 303. Another determination is made in step 301 whether there are any packets in the WMM video queue, and if there are packets in the WMM video queue, then updated information is obtained from the MPEG video clients 102, 103, or 104 in step 304. In step 305, a determination of the transmit time for each live MPEG packet is made, and in step 306, the PTS for each live MPEG packet is obtained. The difference between the PTS and STC for each packet is calculated in step 307. In step 308, a determination is made for the total transmission time for the preceding packets in the WMM queue. The CCA of the back off delay is calculated in step 309. This updated information is then used in step 310 to resort live MPEG video packets in the WMM queue. In step 311, a determination is made whether any of the packets need to be discarded based on the PTS/STC comparison. If packets need to be discarded, the packets are discarded in step 312. In step 313, a determination is made whether any of the packets can be transmitted immediately, if the PTS/STC window can be met. If there are any packets that can be transmitted immediately, then the WMM video is circumvented and the packets are transmitted immediately in step 314. After the packets are transmitted in step 314, the monitor time is set again in step 302, and the process continues.

Computer System Architecture

Figure 4:
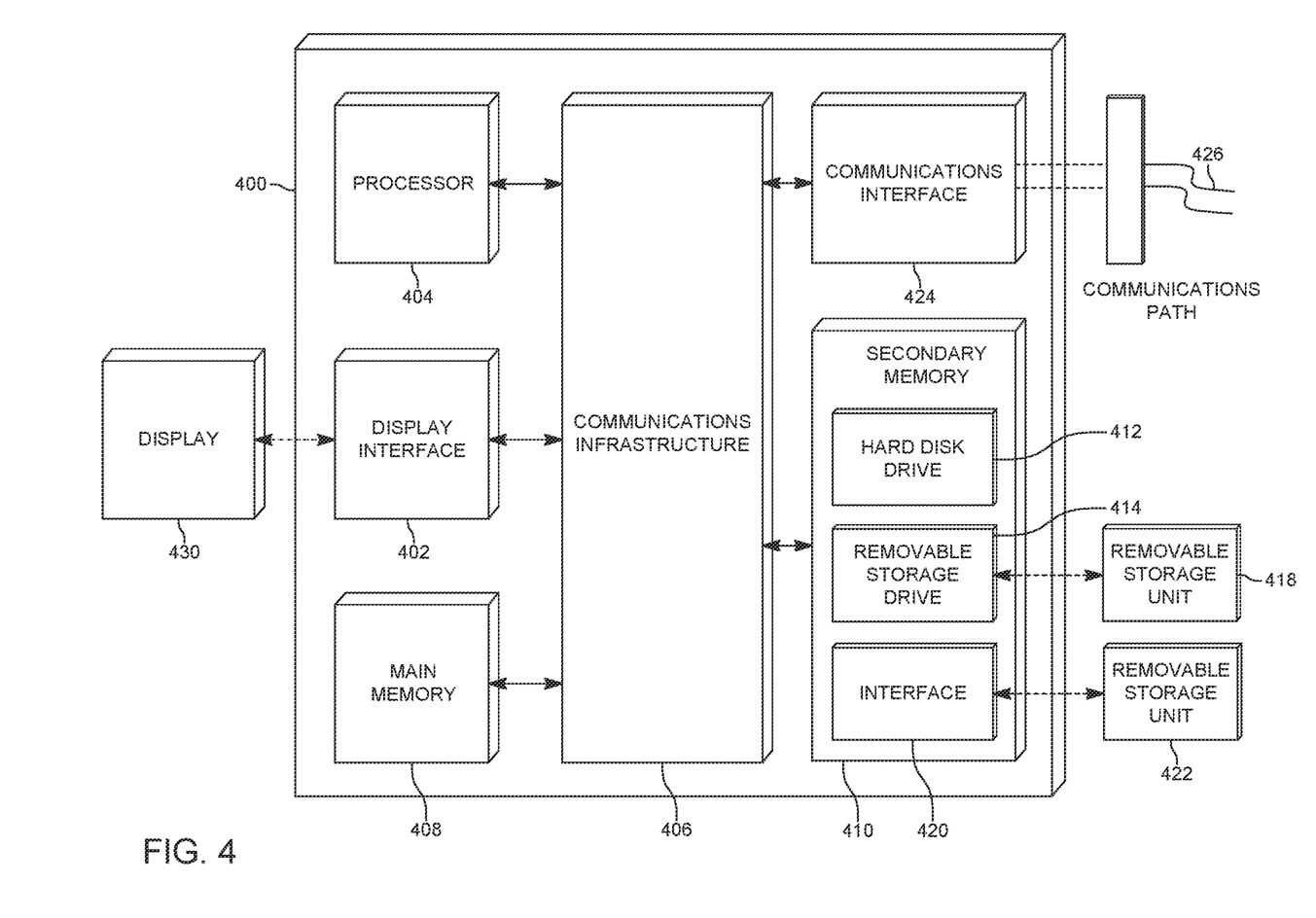
FIG. 4 illustrates a representative computer system.

FIG. 4 illustrates a representative computer system 400 in which embodiments of the present disclosure, or portions thereof, may be implemented as computer-readable code. For example, the Wi-Fi router 101, cell phone 102, DTV 103, set top box 104, and server 105 of FIG. 1 may be implemented in whole or in part by a computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 1.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this representative computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIGS. 2 and 3, as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for reducing file size of a blockchain through hash truncation. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

We claim:

1. A method for wirelessly transmitting time stamped multimedia packets from a wireless router, comprising:
    storing prioritized packets in a queue for transmission;
    receiving at an input port of the wireless router a live stream of time stamped multimedia packets from a server which is capable of providing a system time clock value;
    analyzing the priority of the received multimedia packets;
    comparing the time stamps of the received multimedia packets to the system time clock value;
    calculating, for the received multimedia packets a transmission time to a video client;
    determining a transmission window to transmit the received multimedia packets based on the calculated transmission time;
    comparing the transmission window of received multimedia packets to a total time needed to transmit other packets pending in the queue based on the calculated transmission time; and
    transmitting, immediately from an output port of the wireless router by circumventing the queue, the received multimedia packets to the video client if the total time exceeds the transmission window and transmission of the time stamped multimedia packets within the transmission window can be met; or
    discarding the received multimedia packets if the total time exceeds the transmission window and the packets cannot be transmitted within the transmission window; or
    placing the received packets in the queue as additional prioritized packets for transmission, if the received packets can be transmitted within the transmission window.

2. The method according to claim 1, further comprising resorting the priorities of the prioritized packets in the queue if updated conditions within network affect the transmission time to the video client.

3. The method according to claim 2, wherein the resorting is continuous.

4. The method according to claim 2, wherein resorting the priorities of the prioritized packets is based on their respective relative transmission windows.

5. The method according to claim 1, further comprising resorting the priorities of the prioritized packets in the queue such that if a first packet is behind a second packet in queue and has a shorter transmission window, the first packet will be re-positioned precede the second packet in the queue so that it is transmitted before second packet.

6. The method according to claim 1, further comprising:
    continuously monitoring, by the wireless router, a current PTS Presentation Time Stamps (PTS) of Wi-Fi clients in communication with the wireless router.

7. An apparatus for wirelessly transmitting time stamped multimedia packets, comprising:
    a wireless router having:
        at least an input port for receiving a live stream of time stamped multimedia packets from a server which is capable of providing a system time clock value;
        a queue for storing prioritized packets for transmission;
        a processor for:
            analyzing a priority of the received multimedia packets;
            comparing the time stamps of the received multimedia packets to the system time clock value;
            calculating a transmission time to a video client;
            determining a transmission window to transmit the received multimedia packets, and for comparing the transmission window to a total time needed to transmit the prioritized packets pending in the queue; and
        at least an output port for transmitting immediately, the received multimedia packets to the video client, if the total time exceeds the transmission window and transmission of the received multimedia packets within the transmission window can be met;
    wherein:
        the processor discards the received multimedia packets, if the total time exceeds the transmission window and the packets cannot be transmitted within the transmission window, or
        the processor places the received packets in the queue as additional prioritized packets for transmission, if the time stamped packets can be transmitted within the transmission window.

8. An apparatus according to claim 7, wherein the processor further resorts priorities of the received multimedia packets in the queue if updated conditions within network affect the transmission time to the video client.

9. The apparatus according to claim 7, wherein upon storing the received multimedia packets in the queue as additional prioritized packets the processor resorts the priorities of the prioritized packets in the queue such that if a first packet is behind a second packet in queue and has a shorter transmission window, the first packet will be repositioned precede the second packet in the queue so that it is transmitted before second packet.

10. The method of claim 9, wherein the resorting is continuous.

11. The method of claim 7, wherein the processor resorts the priorities of the prioritized packets in the queue based on their respective relative transmission windows.

12. An apparatus according to claim 7, wherein the processor of the wireless router continuously monitors a current Presentation Time Stamps (PTS) of Wi-Fi clients in communication with the wireless router.

\* \* \* \* \*